March 14, 1950 J. H. HOMRIGHOUS 2,500,356

FREQUENCY CONTROL FOR OSCILLATORS

Original Filed Feb. 24, 1943

INVENTOR

John H. Homrighous

Patented Mar. 14, 1950

2,500,356

UNITED STATES PATENT OFFICE 2,500,356

FREQUENCY CONTROL FOR OSCILLATORS

John H. Homrighous, Oak Park, Ill.

Original application February 24, 1943, Serial No. 476,897. Divided and this application December 27, 1946, Serial No. 718,813

2 Claims. (Cl. 332—38)

My invention relates to frequency control for signal generators or oscillators.

One of the main objects of my invention is the provision of means for stabilizing any frequency generated by a variable frequency oscillator.

Different methods for stabilizing the frequencies of oscillators have been developed, such as a crystal controlled oscillator which generates a single fundamental frequency, thus limiting its flexibility; others employ means to eliminate the effect of a variable voltage supply. In my present invention I provide a variable frequency oscillator having a frequency stabilizing unit or circuit for controlling the oscillator to maintain any desired frequency generated substantially constant.

This application is a division of my prior application Serial No. 476,897 filed February 24, 1943.

Figure 1:
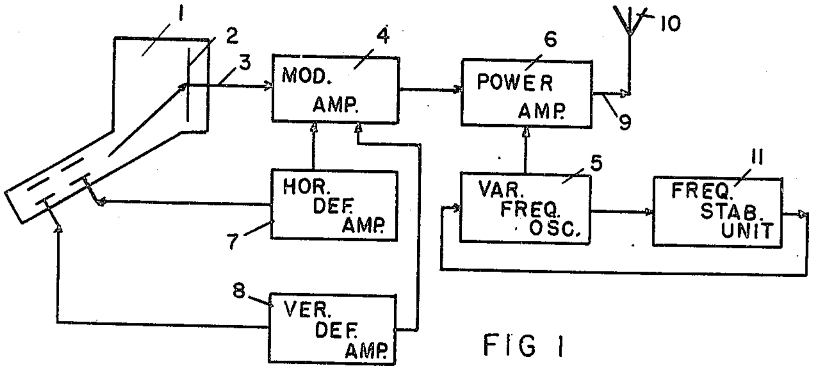
Figure 1 is a simplified block diagram of a television transmitting station illustrating a method employed for stabilizing the frequency of the carrier wave oscillator.

Referring to Figure 1, the numeral 1 designates a cathode ray camera tube of conventional type and is known as an "Iconoscope," and as illustrated it comprises a mosaic 2, photoelectric screen on which a light image of the object is projected and an electron gun for generating a ray of electrons directed at the screen, and two sets of deflecting plates for deflecting the electron ray at the line and field frequencies, so that it is caused to scan the screen. The picture is thereby developed and fed by an output connector 3 to a modulating amplifier 4.

A carrier wave is provided by an oscillator 5 in the power amplifier 6 this carrier wave is modulated by the frequency band video or picture signals and also by synchronizing impulses from the horizontal deflecting apparatus 7 and the vertical deflecting apparatus 8 between the horizontal lines and between the image fields through the modulation amplifier 4. The signals from the amplifier 6 are supplied by a connection 9 to the antenna 10. The oscillator 5 may be controlled by the frequency stabilizing unit 11.

Figure 2:
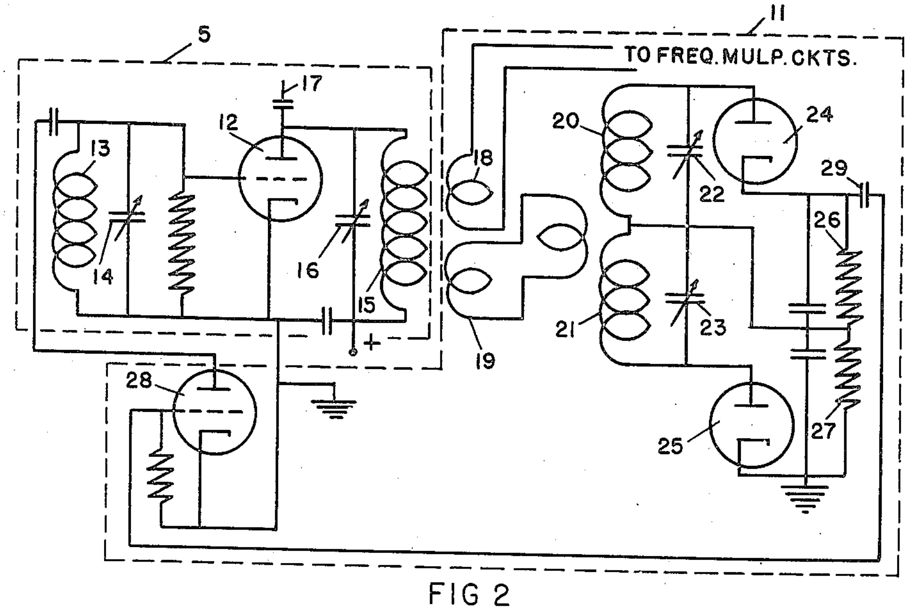
Figure 2 is a schematic diagram for the oscillator and frequency stabilizing unit shown in Figure 1.

With reference to Figure 2, I have shown the variable frequency oscillator 5 having a tuned grid circuit and a tuned plate circuit. Other types of oscillators may be used, and as illustrated it comprises a tube 12, grid coil 13, with variable condenser 14 and plate coil 15 with variable condenser 16. This oscillator utilizes the grid plate capacity of the tube to provide feed back coupling between the two tuned coils. In operation the grid circuit and the plate circuit may be tuned to the same frequency or the plate tank circuit may be tuned to a harmonic of the grid tank circuit, and the frequency of oscillations may be varied by adjusting the two tuned circuits. The high frequency oscillations may be supplied by conductor 17 to the power amplifier 6 or higher frequencies may be supplied from frequency multiplying circuits coupled to the oscillator, as shown at 18.

The frequency stabilizing unit 11 inductively coupled to the oscillator by the link 19 may be employed to stabilize or govern the oscillator frequency when a crystal is not used to control the frequency, and has the advantage of stabilizing more than one frequency for which the oscillator may be developed. The stabilizing unit as shown utilizes the resonance characters of the two tuned circuits having their resonance frequency equally spaced slightly above and below the desired frequency generated by the oscillator. The coils 20 and 21 may be tuned by the variable condensers 22 and 23 for resonance frequencies, one slightly higher and the other one slightly lower than the desired oscillator frequency. The output of these two tuned circuits is fed to two diodes 24 and 25 which are connected to the series load resistors 26 and 27 so that the voltages across these resistors are opposite and equal to the algebraic sum of the output voltage of each tube.

In operation, when an alternating current of a desired frequency is produced by the oscillator 11 and transmitted from the antenna 10, the voltages across the load resistors 26 and 27 are equal and opposite, and as the oscillator frequency varies from the desired frequency, previously determined by the adjustment of the condensers 14 and 16, the voltage across the load resistors becomes unequal, and a voltage equal to the difference between the two voltages appears across the resistances 26 and 27 and is applied to the grid of tube 28. The anode of tube 28 is connected through the condenser 29 to the oscillator grid tank circuit. In operation the plate to cathode resistance of the tube 28 may be variable, depending upon the changing potential supplied to the grid from the load resistances 26 and 27. This variable resistance in series with the condenser 29 will modulate or change the frequency in the oscillator 5. Therefore as the oscillator varies from the desired frequency at which it is tuned, the frequency stabilizing unit 11 will operate to maintain the frequency substantially constant.

While I have shown the oscillator 5 associated with a television station, it is to be understood that the principles involved are equally applicable to any signal generator for carrier waves.

In the circuits shown and described I have omitted the heater filaments for the various tubes, but it will understood that such filaments are necessary.

I do not intend that the present invention shall be restricted to the particular form as herein set forth, but contemplate all modifications and changes therein within the terms of the claims.

Having thus described my invention, I claim:

1. In a radio system, a transmitting station, an oscillator at said station having adjustable means for producing carrier waves of different frequency, a frequency stabilizing unit, comprising a first and a second tunable input circuits electrically connected to said oscillator, operable means to tune said input circuits, the first slightly above resonance for any carrier wave output selected by said adjustable means and the second slightly below resonance for any carrier wave output selected by said adjustable means, for receiving carrier wave energy from said oscillator, an output circuit for said stabilizing unit comprising a pair of rectifiers connected to load resistors for producing voltage changes thereat, depending upon the variations in frequency of the selected carrier wave received in said input circuit, and means to control said oscillator to maintain said carrier wave frequency substantially constant, said last means including an electron tube having an output electrode connected to said oscillator and input electrodes connected to said load resistors to feed said voltage changes to said oscillator.

2. In a radio system, a transmitting station, an oscillator at said station having adjustable means for producing carrier waves of different frequency, a frequency stabilizing unit, comprising tunable input circuits electrically connected to said oscillator, movable means to tune said input circuits to receive carrier wave energy from any carrier wave frequency selected by said adjustable means, an output circuit for said stabilizing unit connected to said oscillator, comprising a frequency discriminator to impress on said oscillator voltage changes, depending upon the variations in frequency of the selected carrier wave received in said input circuit, to control said oscillator to maintain the frequency of said selected carrier wave substantially constant, means to modulate said selected carrier wave with signals representative of a message, and means to transmit said modulated carrier wave.

JOHN H. HOMRIGHOUS.

REFERENCES CITED

The following references are of record in the file of this patent:

UNITED STATES PATENTS

| Number | Name | Date |
|---|---|---|
| 1,712,051 | Round | May 7, 1929 |
| 2,173,301 | Kinross | Sept. 19, 1939 |
| 2,250,519 | Beers | July 29, 1941 |
| 2,312,079 | Crosby | Feb. 23, 1943 |
| 2,357,984 | Travis | Sept. 12, 1944 |
| 2,368,643 | Crosby | Feb. 6, 1945 |

OTHER REFERENCES

FM Discriminators, Kleinman, Radiocraft, page 278, Feb. 1944. (Copy in Division 10 of Patent Office.)